United States Patent
Ghannam et al.

(10) Patent No.: US 10,562,379 B2
(45) Date of Patent: Feb. 18, 2020

(54) CONTROLLING WINDOW TINT LEVELS TO PROTECT THE INTERIOR CABIN OF AN AUTONOMOUS VEHICLE

(71) Applicant: Ford Global Technologies, LLC, Dearborn, MI (US)

(72) Inventors: Mahmoud Yousef Ghannam, Canton, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 15/821,384

(22) Filed: Nov. 22, 2017

(65) Prior Publication Data
US 2019/0152303 A1    May 23, 2019

(51) Int. Cl.
| | | |
|---|---|---|
| *G02F 1/153* | (2006.01) | |
| *B60J 3/04* | (2006.01) | |
| *G02F 1/133* | (2006.01) | |
| *G02F 1/163* | (2006.01) | |

(52) U.S. Cl.
CPC ............. *B60J 3/04* (2013.01); *G02F 1/13306* (2013.01); *G02F 1/163* (2013.01)

(58) Field of Classification Search
CPC .................................. G02F 1/155; G02F 1/163
See application file for complete search history.

(56) References Cited

U.S. PATENT DOCUMENTS

| | | | |
|---|---|---|---|
| 7,134,707 B2 | 11/2006 | Isaac | |
| 7,275,983 B2 | 10/2007 | Aoki et al. | |
| 8,044,784 B2 | 10/2011 | Ghannam et al. | |
| 8,102,586 B2 | 1/2012 | Albahri | |
| 9,409,464 B2 | 8/2016 | Tomkins et al. | |
| 9,566,946 B2 | 2/2017 | Loubiere | |
| 9,638,978 B2 | 5/2017 | Brown et al. | |
| 2006/0158715 A1 | 7/2006 | Furusawa et al. | |
| 2013/0158790 A1* | 6/2013 | McIntyre, Jr. .......... | G02F 1/163 701/36 |
| 2014/0303788 A1 | 10/2014 | Sanders et al. | |
| 2015/0261219 A1 | 9/2015 | Cuddihy et al. | |
| 2018/0046058 A1* | 2/2018 | Kaphengst ................ | B60J 1/00 |

FOREIGN PATENT DOCUMENTS

| | | |
|---|---|---|
| CA | 2745504 A1 | 1/2013 |
| GB | 2441137 A | 2/2008 |
| KR | 20170011750 A | 2/2017 |

* cited by examiner

*Primary Examiner* — Joseph P Martinez
(74) *Attorney, Agent, or Firm* — Frank Lollo; Eversheds Sutherland (US) LLP

(57) ABSTRACT

Method and apparatus are disclosed for controlling window tint levels to protect the interior cabin of an autonomous vehicle. An example vehicle includes photochromic windows and a processor. The processor determines a sun profile based on images of an area external to the vehicle captured by a camera. The processor also determines a protection mode to reduce a current sun projection on an interior of the vehicle based on the sun profile. The processor also individually sets tint levels on the photochromic windows based on the determined protection mode.

17 Claims, 4 Drawing Sheets

CONTROLLING WINDOW TINT LEVELS TO PROTECT THE INTERIOR CABIN OF AN AUTONOMOUS VEHICLE

TECHNICAL FIELD

The present disclosure generally relates to autonomous vehicles and, more specifically, to controlling window tint levels to protect the interior cabin of an autonomous vehicle.

BACKGROUND

Autonomous vehicles (e.g., driverless vehicles, self-driving vehicles, etc.) allow passengers to shift their focus while in a vehicle from driving to enjoying the drive. As such, compared to conventional vehicles, autonomous vehicles may include interior cabins with relatively more expensive components such as displays, systems (e.g., audio-video systems, etc.), furniture, etc. to make the trip for the passengers more comfortable. Additionally, compared to conventional vehicles, autonomous vehicles may draw the attention of pedestrians, who may wish to look inside the autonomous vehicles. Also, to increase efficiency of autonomous vehicles, autonomous vehicles may harvest solar energy via on-board solar panels, which can increase temperatures of the interior cabin.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for controlling window tint to protect the interior of an autonomous vehicle. An example vehicle includes photochromic windows and a processor. The processor determines a sun profile based on images of an area external to the vehicle captured by a camera. The processor also determines a protection mode to reduce a current sun projection on an interior of the vehicle based on the sun profile. The processor also individually sets tint levels on the photochromic windows based on the determined protection mode.

An example method to control tint levels of the vehicle includes determining, with a processor, a sun profile based on images of an area external to the vehicle captured by a camera. The method also includes determining a protection mode to reduce a current sun projection on an interior component of the vehicle based on the sun profile. The method also includes setting, via photochromic controllers, tint levels on one or more photochromic windows of the vehicle based on the determined protection mode.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
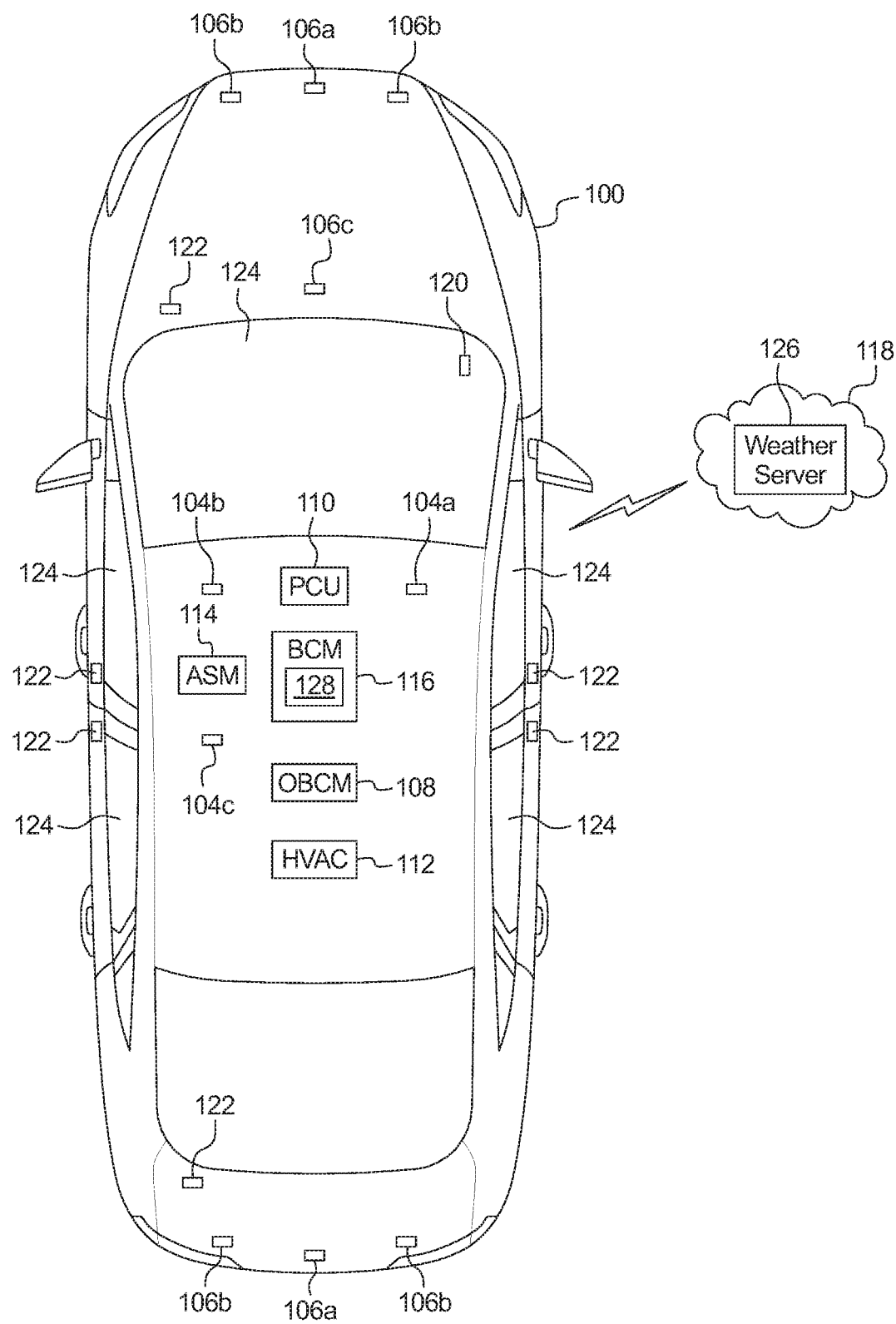
FIG. 1 illustrates an example autonomous vehicle operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Autonomous vehicles have systems that autonomously control the motive functions of the vehicle without direct human input. Because the vehicles are autonomous, it is desirable for the cabin to be comfortable for the passengers. Comfortable cabins may include high-end upholstery and audio-video systems such as entertainment systems that allow passengers to, for example, watch movies, play video games, teleconference, etc. while being transported by the autonomous vehicles. However, such interior cabins may also draw unwanted attention of a passerby. Thus, it is desirable to control tint levels of the windows of the autonomous vehicle to protect the interior cabin of the autonomous vehicle.

In general, windshields are designed to protect the occupants of the vehicle from debris and provide an aerodynamic shape to reduce drag forces. The glass in the windows may be laminated or tempered to protect occupants during a collision. Additionally, windows in the vehicles provide visibility to allow the driver to see the road and surroundings in addition to allowing passengers to view the environment exterior to the vehicle for their own enjoyment and/or to aid the driver. Different jurisdictions have different laws regarding tinting on vehicle windows. Often, the tint of a window is specified by the transparency of the window with the tint applied. For example, many jurisdictions prohibit applying a tint to windshields and limit the tinting (e.g., at least 70% transparency) on the rear, roof, and side windows. The restrictions on minimum transparency originate from the need for drivers to have optimized forward visibility at night and also out the side and rear windows for optimized use of mirrors. Because many trucks have solid rear cargo zones, this requirement on tinting is not enforced rear of the B-pillar for trucks (SUV and Cross-over vehicles are classified as trucks). However, in the case of an autonomous vehicle, visibility needs are confined to the optical aperture of the camera or LiDAR device thus allowing greater tinting levels for all glazing surfaces including the windshield.

As disclosed below, an autonomous vehicle includes windows that incorporate a photochromic or liquid crystal layer that controls the tinting level of the window from 0% to 100% transparency. The autonomous vehicle controls the tinting of each window individually. In some examples, each window may be divided into multiple zones in which the level of tint can be individually controlled. Changing the tinting of the windows controls the sun projections in the cabin of the vehicle. For example, the autonomous vehicle may fully tint a window directly facing the sun to block or obstruct projections of the sun through the window. In other examples, the autonomous vehicle may partially tint a window to decrease (or reduce) glare on a display device from projections of the sun through the window.

The vehicle uses several factors to determine (a) the tinting level (e.g., from 0% tinting to 100% tinting) for the windows and (b) to which windows to apply different tinting levels. In some examples, the vehicle uses (i) images of the cabin, (ii) images of areas external to the autonomous vehicle 100, (iii) the external ambient temperature, (iv) the cabin (e.g., internal) temperature, (v) a position (e.g., location and/or orientation) of the autonomous vehicle 100, (vi) the current vehicle sun load, (vii) the current driving function of the vehicle (e.g., driving, parked, etc.), (viii) the driving mode of the vehicle (e.g., an autonomous mode, a manual driving mode, etc.), (ix) the number and location of occupants of the vehicle, (x) what the occupants, if any, are watching, (xi) the weather, (xii) the time of day, and/or (xiii) the presence of emergency conditions, etc. The tint controller 128 also sets the tint level in accordance with the laws of the local jurisdiction. Based on the factors, the vehicle continuously adjusts (e.g., updates) the tinting to adapt to changes in the conditions around the vehicle.

FIG. 1 illustrates an example autonomous vehicle 100 operating in accordance with the teachings of this disclosure. The autonomous vehicle 100 of FIG. 1 is an electric vehicle. However, it should be appreciated that the autonomous vehicle 100 may be any type of autonomous vehicle, such as a gasoline powered vehicle, a hybrid vehicle, a fuel cell (e.g., hydrogen) vehicle and/or any other mobility implement type of vehicle. The autonomous vehicle 100 includes parts related to mobility, such as a power train with an electric motor, a transmission, a suspension, a driveshaft, and/or wheels, etc. The motive functions of the autonomous vehicle 100 are controlled without direct input from a driver. In some examples, the autonomous vehicle 100 includes different automated driving modes, or occupant-selectable driving modes, such as a fully autonomous mode, a driver assist mode (e.g., certain motive functions are controlled by the autonomous vehicle 100, etc.), and a manual driving mode. In the illustrated example of FIG. 1, the autonomous vehicle 100 includes internal sensors 104a-104c, external sensors 106a-106c, an on-board communications module (OBCM) 108, a powertrain control unit (PCU) 110, a heating, ventilation, and air conditioning (HVAC) control module 112, an active safety module (ASM) 114, and a body control module (BCM) 116.

The internal sensors 104a-104c monitor conditions in the cabin of the autonomous vehicle 100. The internal sensors 104a-104c include one or more cameras 104a, one or more weight sensors 104b, and/or a temperature sensor 104c. The camera(s) 104a monitor the cabin to determine whether the autonomous vehicle 100 is occupied and, when occupied, the location(s) (e.g., seating positions) of the occupant(s) inside the autonomous vehicle 100. The camera(s) 104a may also monitor to determine where occupants, if any, are watching within the cabin. For example, occupants may be watching a video on a display. In other examples, the camera(s) 104 may determine that the occupants are positioned with their eyes closed (e.g., are sleeping). The weight sensor(s) 104b monitor seats in the autonomous vehicle 100 to determine whether the autonomous vehicle 100 is occupied and, when occupied, the location(s) (e.g., seating positions) of the occupant(s) inside the autonomous vehicle 100. The temperature sensor 104c monitors the temperature inside the cabin of the autonomous vehicle 100.

The external sensors 106a-106c monitor conditions in the external area proximate the autonomous vehicle 100. The external sensors 106a-106c include one or more external cameras 106a, range detection sensors 106b (e.g., ultrasonic sensors, RADAR, and/or LiDAR, etc.), and/or an external temperature sensor 106c. The camera(s) 106a and the range detection sensors 106b are used (e.g., by the active safety module 114) to determine the characteristics of the environment around the autonomous vehicle 100 to facilitate autonomous navigation. The external temperature sensor 106c measures the ambient temperature of the area around the autonomous vehicle 100. Alternatively or additionally, in some examples, the ambient temperature of the area around the autonomous vehicle 100 is provided by a weather server 126.

The on-board communications module 108 facilitates the autonomous vehicle at communicating with mobile devices (e.g., smart phones, smart watches, etc.), other vehicles, and/or external networks 118 to obtain data about the environment in which the autonomous vehicle 100 is traveling, obtain user preferences, and/or assist autonomous navigation, etc. The on-board communications module 108 includes wired and/or wireless network interfaces to enable communication with external networks. The on-board communications module 108 also includes hardware (e.g., processors, memory, storage, antenna, etc.) and software to control the wired and/or wireless network interfaces. In the illustrated example of FIG. 1, the on-board communications module 108 includes one or more communication controllers for standards-based networks, such as cellular networks (e.g., Global System for Mobile Communications (GSM), Universal Mobile Telecommunications System (UMTS), Long Term Evolution (LTE), Code Division Multiple Access (CDMA), etc.), wide area networks (e.g., WiMAX (IEEE 802.16m), Wireless Gigabit (IEEE 802.11ad), etc.), local area wireless network (including IEEE 802.11 a/b/g/n/ac or others), personal area networks (e.g., Bluetooth®, Bluetooth® Low Energy, Z-Wave®, Zigbee®, etc.) and/or vehicle-to-vehicle networks (e.g., dedicated short range communication (DSRC), etc.), etc. In some examples, the on-board communications module 108 includes a wired or wireless interface (e.g., an auxiliary port, a Universal Serial Bus (USB) port, a Bluetooth® wireless node, etc.) to communicatively couple with a mobile device (e.g., a smart phone, a smart watch, a tablet, etc.). In such examples, the autonomous vehicle 100 may communicate with the external network 118 via the coupled mobile device. The external network(s) 118 may be a public network, such as the Internet; a private network, such as an intranet; or a combination thereof, and may utilize a variety of networking protocols now available or later developed including, but not limited to, TCP/IP-based networking protocols.

The powertrain control unit 110 controls the motor, the transmission, and the power system of the autonomous vehicle 100. The active safety module 114 controls the autonomous navigation of the autonomous vehicle 100 with information from the external sensors 106a, 106b and/or the on-board communications module 108. The active safety module 114 communicates (e.g., via a vehicle data bus 202 of FIG. 2 below) the state of the autonomous vehicle 100 (e.g., whether the vehicle is in full autonomous mode, driver assist mode, driver control mode, moving, parking, etc.).

The HVAC control module 112 controls the components of an HVAC system (e.g., heaters, blowers, duct gates, vents, injectors, chillers, and filters that control the temperature, quality, and routing of the air circulating in the cabin of the vehicle, etc.) accordingly to influence the internal cabin temperature according to its settings. These settings may be received from an occupant's physical or virtual controls on a center console, a mobile device communicatively coupled to the on-board communications module 108, and/or internal memory. In some examples, the internal memory contains settings for the HVAC control module 112 based on, for example, whether the autonomous vehicle 100 is occupied and when the autonomous vehicle 100 is next expected to be occupied. The HVAC control module 112 communicates (e.g., via the vehicle data bus 202 of FIG. 2 below) the state of the HVAC system.

The body control module 116 controls various subsystems of the autonomous vehicle 100. For example, the body control module 116 may control power windows, power locks, an immobilizer system, and/or power mirrors, etc. The body control module 116 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In the illustrated example, the body control module 116 is communicatively coupled to a sunload sensor 120 and photochromic controls 122 for each window 124. The sunload sensor 120 measures the energy (in Watts per meter squared (W/m$^2$)) of solar radiation affecting the autonomous vehicle 100. Alternatively or additionally, in some examples, the body control module 116 receives the sun load from the weather server 126 via the external network 118. Hereafter, the term sunny is being used as an indication of sun load. Even an overcast day may generate sufficient sun load for the vehicle tint controller 128 to consider the day "sunny." However, on the same day with the same level of overcast cloud cover, the sun load at mid-morning or late afternoon may be characterized as not sunny due to reduced sun load resulting from the lower angles of the sun. Conversely, the level of sun load on an overcast day can also vary significantly based on the position of the vehicle on the earth (i.e., equator versus pole regions).

The photochromic controls 122 control, from 0% transparency to 100% transparency, the level of tinting for each window 124 of the autonomous vehicle 100. The windows 124 incorporate a photochromic or liquid crystal layer between a glass layer and a plastic layer. In the illustrated example of FIG. 1, the photochromic controls 122 control the transparency of the window 124 by varying the voltage to the photochromic or liquid crystal layer. In some examples, the photochromic controls 122 include a signal generator electrically coupled to the photochromic or liquid crystal layer to vary the transparency of the corresponding window 124 in proportion to a respective drive voltage signal. The transparency affects the contribution of the sun load to the internal temperature of the autonomous vehicle 100 and the projection of the sun onto components of the cabin. Because each window has a separate photochromic control 122, the body control module 116 can change the tint level of each window independently.

The body control module 116 of FIG. 1 includes an example tint controller 128. The tint controller 128 controls the tint of the windows 124 based on (i) images of the cabin, (ii) images of areas external to the autonomous vehicle 100, (iii) the external ambient temperature, (iv) the cabin (e.g., internal) temperature, (v) a position (e.g., location and/or orientation) of the autonomous vehicle 100, (vi) the current vehicle sun load, (vii) the current driving function of the vehicle (e.g., driving, parked, etc.), (viii) the driving mode of the vehicle (e.g., an autonomous mode, a manual driving mode, etc.), (ix) the number and location of occupants of the vehicle, (x) what the occupants, if any, are watching, (xi) the weather, (xii) the time of day, and/or (xiii) the presence of emergency conditions, etc. The tint controller 128 also sets the tint level in accordance with the laws of the local jurisdiction.

The tint controller 128 controls the tint level of the windows 124, via the photochromic controls 122, based on how the sun is projecting into the cabin of the autonomous vehicle 100. For example, the sun may be directly projecting through a window 124, may be partially projecting through a window 124, and/or may not be projecting through a window 124. Based on how the sun is projecting through a window 124 of the autonomous vehicle 100, the tint controller 128 selects a protection mode associated with a tint level to protect the interior cabin of the autonomous vehicle 100. Example protection modes include a directed sun-glass mode, an angled sun-glass mode, and a shade sun-glass mode. Additionally, in some examples, the tint of the windows 124 is manually adjustable by the occupants via a physical or virtual interface on, for example, the center console. For example, an occupant wanting privacy may manually select a fully tinted tint level of the windows 124.

In the illustrated example, the tint controller 128 selects the directed sun-glass mode for a window when the window is subject to direct sun projection. For example, the front windshield is subject to direct sun projection when the sun is positioned directly in front of the autonomous vehicle 100. The directed sun-glass mode tints the window and obstructs the sun completely (or nearly completely) (e.g., sets the tint levels to 70% darkness to 100% darkness). As used herein, the terms "fully tinted," "full tint level," and/or variations thereof, refer to the maximum amount of tint level that, as defined by the tint controller 128, can be controlled for each of the windows 124. For example, a fully tinted (or full tint level) windshield may have a tint level of 15% transparency to accommodate externally facing cabin cameras and a fully tinted sunroof and/or moon roof may have a transparency of 0%.

In the illustrated example, the tint controller 128 selects the angled sun-glass mode for a window of the autonomous vehicle 100 when the window is subject to partial sun projections. For example, a window may be subject to partial sun projections when the sun is not positioned directly in front of the window. The angled sun-glass mode tints the window to between 40% darkness to 70% darkness.

In the illustrated example, the tint controller 128 selects the shade sun-glass mode for a window of the autonomous vehicle 100 when the window is opposite to the position of the sun. For example, in the above example where the sun is directly in front of the autonomous vehicle 100, the rear windshield of the autonomous vehicle 100 is positioned opposite to the position of the sun. The shade sun-glass mode is associated with a tint level of the window to lessen pedestrian attention to the cabin of the autonomous vehicle 100 (e.g., 0% darkness to 40% darkness).

The tint controller 128 selects the protection mode to apply to the windows 124 of the autonomous vehicle 100 based on a plurality of factors including information derived from images of the cabin of the autonomous vehicle 100 and images of the area external to the autonomous vehicle 100. For example, the tint controller 128 may process images captured by the internal camera(s) 104*a* of the cabin to determine whether the cabin includes at least one passenger, where the passenger is looking (e.g., looking at a display within the cabin, looking outside of the autonomous vehicle 100, etc.), whether the passenger is sleeping, whether the current position of the sun is resulting in a projection through a window and onto a component (e.g., a display) of the cabin, etc. The tint controller 128 may apply different image processing techniques and/or facial recognition techniques to process the images captured of the cabin.

The tint controller 128 may also process images captured by the external cameras 106a of areas external to the autonomous vehicle. For example, the tint controller 128 may apply different image processing techniques and/or facial recognition techniques to the images captured by the external cameras 106a to determine, for example, the current position of the sun, proximity of the autonomous vehicle 100 to buildings and/or obstructions that may block sun projections, an orientation of the autonomous vehicle 100, whether emergency conditions are present (e.g., suspicious pedestrian activity proximate to the autonomous vehicle 100, etc.), weather conditions (e.g., whether it is sunny, overcast, etc.), reflections, etc.

In the illustrated example, the tint controller 128 uses the information obtained from the internal camera(s) 104a and the external cameras 106a, along with information collected from other components and sensors of the autonomous vehicle 100 (e.g., sun load information from the sunload sensor 120, coordinates (e.g., location and orientation) of the autonomous vehicle 100 from a GPS receiver, weather information from the weather server 126, information about the parking location via vehicle-to-vehicle communication, etc.), to generate a sun profile. As described below, the sun profile includes information about the sun relative to the autonomous vehicle 100 and/or as a function of time, such as, for example, a current position of the autonomous vehicle 100, a current orientation of the autonomous vehicle 100, a current position of the sun, the predicted path of the sun relative to the autonomous vehicle 100, weather information over a period of time, the sun load affecting the autonomous vehicle 100 over time, etc. The sun profile may also include which windows 124 of the autonomous vehicle 100 are in the predicted path of the sun over a period of time (e.g., a predicted projection of the sun relative to the autonomous vehicle 100).

In the illustrated example, the tint controller 128 applies the protection mode to each of the windows 124 of the autonomous vehicle 100 based on the sun profile. The tint controller 128 may also apply the protection modes based on activities of the occupants (sometimes referred to herein as "passengers") of the autonomous vehicle 100. For example, using image processing techniques and/or facial recognition techniques, the tint controller 128 may determine that an occupant may be watching a movie, playing a video game, teleconferencing, etc. via a display device in the cabin of the autonomous vehicle. In other examples, the occupant may be sleeping (or have their eyes closed). The tint controller 128 may then determine whether the current sun position is resulting in a projection onto the display and/or the face of the occupant and apply a protection mode on the window(s) 124 of the autonomous vehicle 100 to block the sun projection and/or minimize the effect of the sun projection on the occupant.

In some examples, if the tint controller 128 determines that the occupants are watching a display and that the current time of day corresponds to night time, the tint controller 128 may apply a protection mode to prevent people outside of the autonomous vehicle 100 from looking into the autonomous vehicle 100. For example, the tint controller 128 may apply a protection mode to fully tint the windows 124 of the autonomous vehicle 100.

Additionally, in some examples, the tint controller 128 continually monitors and adjusts (e.g., updates) the tint level of the windows 124, for example, based on updated images captured (e.g., more recently captured) by the internal camera(s) 104a and/or the external cameras 106a. For example, after initially setting the tint level of the windows 124, if the sun projection changes (e.g., due to movement of the autonomous vehicle 100, due to changes in the surroundings of the autonomous vehicle 100, etc.), the tint controller 128 may further increase or decrease the transparency of the windows 124.

Figure 2:
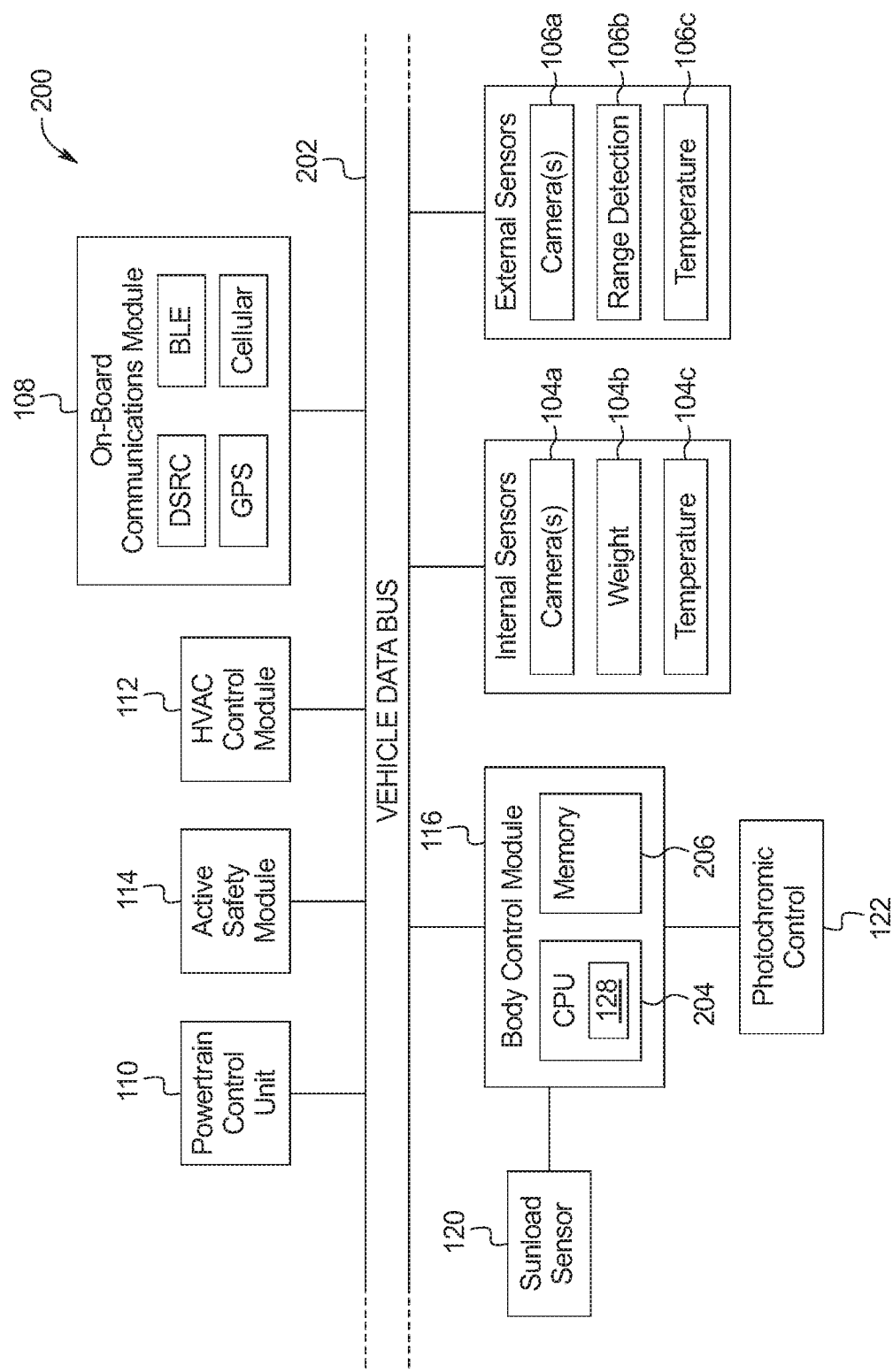
FIG. 2 is a block diagram of electronic components of the autonomous vehicle of FIG. 1.

FIG. 2 is a block diagram of electronic components 200 of the autonomous vehicle 100 of FIG. 1. In the illustrated example of FIG. 2, the electronic components 200 include the internal sensors 104a-104c, the external sensors 106a-106c, the on-board communications module 108, the powertrain control unit 110, the HVAC control module 112, the active safety module 114, the body control module 116, and a vehicle data bus 202.

The body control module 116 includes a processor 204 (sometimes referred to herein as a "controller") and memory 206. In the illustrated example, the body control module 116 is structured to include the tint controller 128. The processor 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms), non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc). In some examples, the memory 206 includes multiple kinds of memory, particularly volatile memory and non-volatile memory. In some examples, the memory 206 stores a lookup table that associates an orientation of the vehicle, the location of the vehicle (e.g. via coordinates generated by a global positioning system (d) receiver), the time of day, and the date with a position of the sun.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the internal sensors 104a-104c, the external sensors 106a-106c, the on-board communications module 108, the power train control unit 110, the HVAC control module 112, the active safety module 114, and/or the body control module 116. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
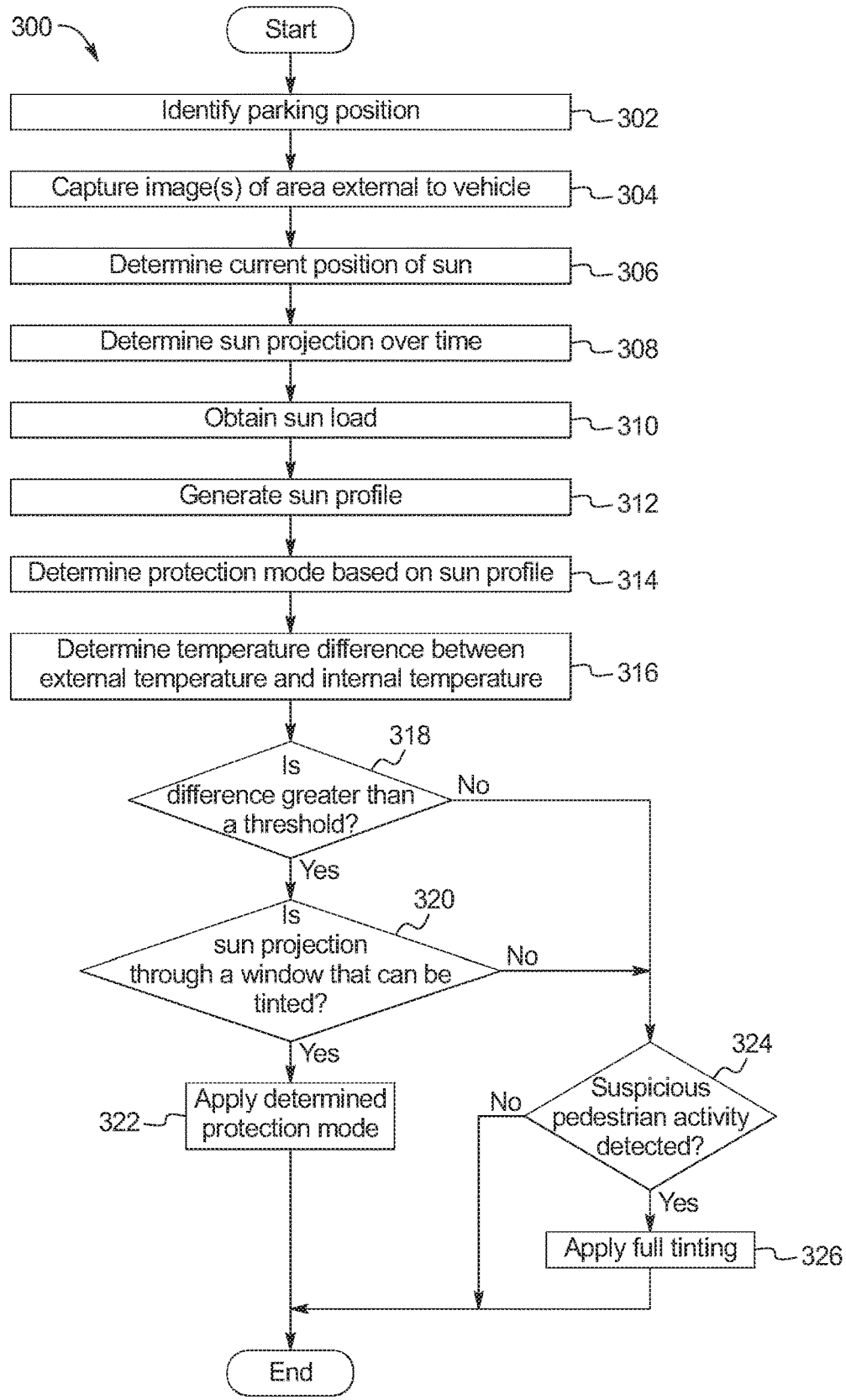
FIG. 3 is a flowchart of a method to facilitate controlling window tint levels to protect the interior cabin of the autonomous vehicle of FIG. 1, which may be implemented by the electronic components of FIG. 2.
Figure 4:
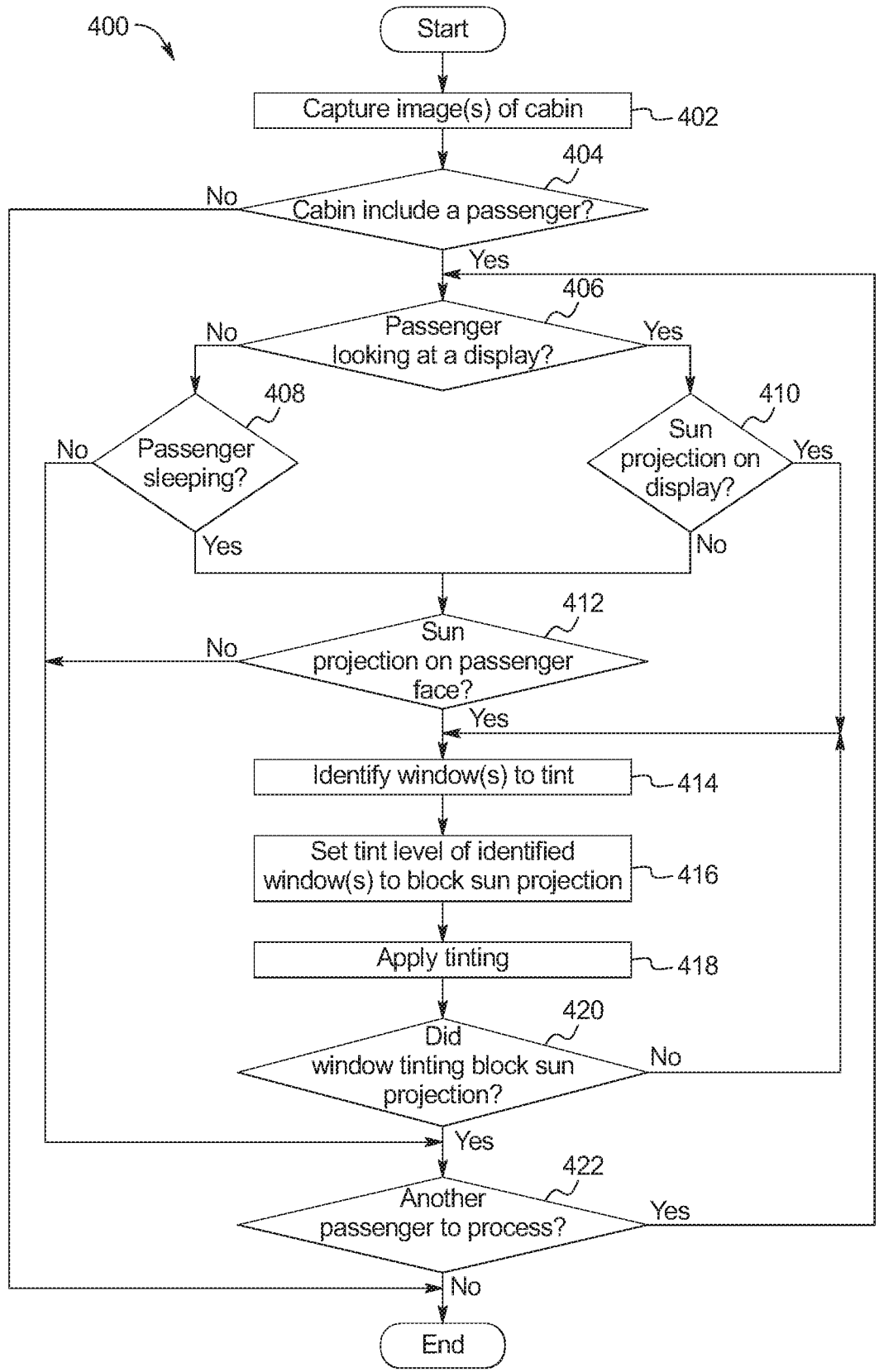
FIG. 4 is a flowchart of a method to facilitate reducing sun projection relative to occupants of the autonomous vehicle of FIG. 1, which may be implemented by the electronic components of FIG. 2.

The flowcharts of FIGS. 3 and 4 are representative of machine readable instructions stored in memory (such as the memory 206 of FIG. 2) that comprise one or more programs that, when executed by a processor (such as the processor 204 of FIG. 2), cause the autonomous vehicle 100 of FIG. 1 to implement the example tint controller 128 of FIGS. 1 and/or 2. Further, although the example program(s) is/are described with reference to the flowcharts illustrated in FIGS. 3 and 4, many other methods of implementing the example tint controller 128 may alternatively be used. For example, the order of execution of the blocks may be changed, and/or some of the blocks described may be changed, eliminated, or combined.

FIG. 3 is a flowchart of a method 300 to facilitate controlling window tint levels to protect the interior cabin of the autonomous vehicle 100 of FIG. 1, which may be implemented by the electronic components 200 of FIG. 2. Initially, at block 302, the tint controller 128 identifies a parking position of the autonomous vehicle 100. For example, the tint controller 128 may obtain coordinates generated by a global positioning system (GPS) receiver and an orientation of the vehicle. At block 304, the external cameras 106a capture image(s) of the area external to the autonomous vehicle 100. The image(s) captured by the external cameras 106a may include information such as the current position of the sun, the location of buildings or other obstructions proximate to the autonomous vehicle 100, etc. At block 306, the tint controller 128 determines the current position of the sun. For example, the tint controller 128 may apply image processing techniques to the image(s) captured by the external cameras 106a to determine the current position of the sun. Additionally or alternatively, the tint controller 128 may receive current sun position information from the weather server 126 via the external network 118. At block 308, the tint controller 128 determines a sun projection over time. For example, the tint controller 128 may use the position information of the vehicle (e.g., location and orientation of the vehicle), the time of day, the date, and the current position of the sun to predict a projection of the sun relative to the autonomous vehicle 100 over time. For example, the tint controller 128 may predict that, for a car oriented north-south, the sun will first project onto the right-side windows and move to the left-side windows over the course of the day. At block 310, the tint controller 128 obtains sun load information. For example, the tint controller 128 may obtain the sun load information from the sunload sensor 120. Additionally or alternatively, the tint controller 128 may obtain the sun load information from the weather server 126 via the external network 118.

At block 312, the tint controller 128 generates a sun profile for the sun and autonomous vehicle 100 based on the collected information such as the image(s) captured by the external cameras 106a. The sun profile includes information about the sun relative to the autonomous vehicle 100 such as, for example, a current position of the autonomous vehicle 100, a current orientation of the autonomous vehicle 100, a current position of the sun, the predicted path of the sun relative to the autonomous vehicle 100, weather information (e.g., whether it is sunny, cloudy, etc.) over a period of time, the sun load affecting the autonomous vehicle 100 over time, etc. The sun profile may also include which windows 124 of the autonomous vehicle 100 are in the predicted path of the sun over a period of time (e.g., a predicted projection of the sun relative to the autonomous vehicle 100). At block 314, the tint controller 128 determines a protection mode based on the sun profile. For example, the sun profile may indicate that the sun is currently positioned on the right-side of the autonomous vehicle 100. The tint controller 128 may then select the directed sun-glass mode for the right-side windows 124 of the autonomous vehicle 100 to tint and obstruct the sun completely (e.g., 100% darkness). The tint controller 128 may also select the shade sun-glass mode for the windshield and left-side windows 124 of the autonomous vehicle to partially shade the respective windows 124 and minimize the ability of pedestrians to look inside at the cabin of the autonomous vehicle 100. The tint controller 128 may also select to apply the angled sun-glass mode for the rear windows 124, which may be subject to partial sun projections (e.g., where the sun is not vertical to or directly projecting on to the windows), and to tint the windows to about 65% darkness.

At block 316, the tint controller 128 determines the temperature difference between the external ambient temperature and the internal temperature. For example, the tint controller 128 may obtain the external ambient temperature from the external temperature sensor 106c and/or the weather server 126 (e.g., via the external network 118), and the tint controller 128 may obtain the internal temperature from the internal temperature sensor 104c. At block 318, the tint controller 128 determines whether the temperature difference is greater than a threshold. To conserve power, the tint controller 128 does not modify the tint levels of the windows 124 when the temperature difference is less than the threshold. When the temperature difference is greater than the threshold, the method 300 continues at block 320. When the temperature difference is less than the threshold, the method continues at block 324.

At block 320, the tint controller 128 determines whether the current sun projection is through (e.g., overlaps with) a window that can be tinted. When the current sun projection is through a window that can be tinted, the method 300 continues at block 322. When the current sun projection is through a window that cannot be tinted, the method 300 continues at block 324. At block 322, the tint controller 128 applies the protection mode for the window 124 that was determined at block 314 (e.g., between 0% transparency and 100% transparency, etc.). The example method 300 then ends.

At block 324, the tint controller 128 determines whether there is any suspicious pedestrian activity proximate to the autonomous vehicle 100. For example, the tint controller 128 may apply image processing techniques to image(s) captured by the external cameras 106a to determine whether there is suspicious pedestrian activity proximate to the autonomous vehicle 100. Example image processing techniques may include identifying objects in hands of nearby pedestrians, performing facial recognition techniques on nearby pedestrians, etc. When the tint controller 128 detects suspicious pedestrian activity, the method 300 continues at block 326. When the tint controller 128 does not detect suspicious pedestrian activity, the method 300 ends.

At block 326, the tint controller 128 applies full tinting to the windows 124 of the autonomous vehicle 100 (e.g., set transparency to 0%) to block pedestrians from looking into the cabin of the autonomous vehicle 100. In the illustrated example, the tint controller 128 applies full tinting to the windows 124 of the autonomous vehicle 100 that are capable of being tinted. The method 300 then ends.

Although the example method 300 of FIG. 3 is directed to an autonomous vehicle that is in a parked state, the method 300 may additionally or alternatively be used by an autonomous vehicle that is in a driving state. In some such examples, the tint controller 128 may increase and/or decrease the frequency with which it performs the method 300 of FIG. 3 based on the current driving function (e.g., driving, parked, etc.) of the autonomous vehicle. For example, the tint controller 128 may increase the frequency with which it performs the method 300 of FIG. 3 when the autonomous vehicle is in the driving state compared to when the autonomous vehicle is in the parked state.

FIG. 4 is a flowchart of a method 400 to facilitate reducing sun projection relative to occupants of the autonomous vehicle 100 of FIG. 1, which may be implemented by the electronic components 200 of FIG. 2. At block 402, the example internal camera(s) 104a capture image(s) of the cabin of the autonomous vehicle 100. At block 404, the example tint controller 128 determines whether the cabin includes any passengers. For example, the tint controller 128 processes the images of the cabin captured by the internal camera(s) 104a and uses image processing techniques to determine whether the cabin includes any passengers. When the tint controller 128 determines that the cabin does not include any passengers, the method 400 of FIG. 4 ends. When the tint controller 128 determines that the cabin includes at least one passenger, the method 400 continues to block 406.

At block 406, the tint controller 128 selects a passenger to process and determines whether the passenger is looking at a display within the cabin. For example, the passenger may be watching a movie, playing a video game, teleconferencing, etc. via an entertainment system of the autonomous vehicle 100. When the tint controller 128 determines that the selected passenger is not looking at a display, the method 400 continues to block 410 to determine whether the selected passenger is sleeping (or at least has closed their eyes). When the tint controller 128 determines that the selected passenger is looking at a display within the cabin, the method 400 continues to block 408.

At block 408, the tint controller 128 determines whether there is a current sun projection on the display. For example, the tint controller 128 may process the images of the cabin captured by the internal camera(s) 104a to determine whether there is any current sun projection on the display. When the tint controller 128 determines that there is no current sun projection on the display, the method 400 continues to block 412 to determine whether there is any current sun projection on the face of the selected passenger. When the tint controller 128 determines that there is a current sun projection on the display, the method 400 continues to block 414 to identify one or more windows to tint.

At block 410, the tint controller 128 determines whether the selected passenger is sleeping (or at least has their eyes closed). For example, the tint controller 128 may process the images of the cabin captured by the internal camera(s) 104 and apply facial recognition techniques to determine whether the selected passenger is sleeping. When the tint controller 128 determines that the selected passenger is not sleeping, the method 400 continues to block 422 to determine whether there is another passenger in the cabin to process. When the tint controller 128 determines that the selected passenger is sleeping (or at least has their eyes closed), the method 400 continues to block 412.

At block 412, the tint controller 128 determines whether there is any current sun projection on the face of the selected passenger. For example, the tint controller 128 may apply image processing techniques to the images captured by the internal camera(s) 104a to determine whether there is any current sun projection on the face of the selected passenger. Additionally or alternatively, the tint controller 128 may apply facial recognition techniques to the images captured by the internal camera(s) 104a to determine whether there is any current sun projection on the face of the selected passenger or if the selected passenger is making facial expressions of distress, such as squinting, to avoid the sun projection in their eyes. When the tint controller 128 determines that there is no current sun projection on the face of the selected passenger, the method 400 continues to block 422 to determine whether there is another passenger in the cabin to process. When the tint controller 128 determines that there is a current sun projection on the face of the selected passenger, the method 400 continues to block 414 to identify one or more windows to tint.

At block 414, the tint controller 128 determines which windows 124 of the autonomous vehicle 100 to tint based on the location of the display, the location of the selected passenger and/or the location of the sun relative to the windows 124. The tint controller 128 may also include current tint levels of the windows 124 when determining which windows 124 to tint. At block 416, the tint controller 128 determines a level of tinting for the window(s) 124 selected at block 414. For example, the tint controller 128 may apply an angled sun-glass mode tint level to the windshield and a shade sun-glass mode tint level to the other windows 124 that are in the sunlight. At block 418, the tint controller applies the tint determined at block 416 to the windows (e.g., between 0% transparency and 100% transparency, etc.).

At block 420, the tint controller 128 determines whether the window tinting applied at block 418 blocked the sun projection. For example, the internal camera(s) 104a may periodically capture updated (e.g., additional) images of the cabin and the tint controller 128 may apply image processing techniques and/or facial recognition techniques to the captured, updated images to determine whether the applied window tinting blocked the sun projection. When the tint controller 128 determines that the window tinting applied at block 418 did not block the sun projection (e.g., either on the display and/or the face of the passenger), the method 400 returns to block 414 to identify which windows 124 of the autonomous vehicle 100 to tint. When the tint controller 128 determines that the window tinting applied at block 418 blocked the sun projection, the method 400 continues to block 422 to determine whether there is another passenger in the cabin to process.

At block 422, the tint controller 128 determines whether there is another passenger in the cabin to process. For example, the tint controller 128 may process any images of the cabin captured by the internal camera(s) 104a to determine whether there is at least one more passenger to process. When the tint controller 128 determines that there is at least one more passenger in the cabin to process, the method 400 returns to block 406 to select a passenger to process and determine whether the passenger is looking at a display within the cabin. When the tint controller 128 determines that there is not another passenger in the cabin to process, the method 400 ends.

Although the above-described examples focus on projections caused by the sun, the present disclosure contemplates examples in which the tint control feature is employed on any suitable light source, including artificial light sources such as street lights, headlights, moonlight, etc. For example, it should be appreciated that an artificial light source, such as a headlight of a comparatively tall truck, may be project into the cabin and onto displays within the cabin of the autonomous vehicle.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or." The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   photochromic windows;
   sensors; and
   a processor configured to:
     determine a sun profile based on images of an area external to the vehicle captured by a camera;
     determine a protection mode to reduce a current sun projection on an interior of the vehicle based on the sun profile, wherein the protection mode is at least one of a directed sun-glass mode, an angled sun-glass mode, and a shade sun-glass mode;
     determine, via the sensors, a difference between an external ambient temperature and a cabin temperature;
     when the difference is greater than a threshold, individually set tint levels on the photochromic windows based on the determined protection mode; and
     responsive to detecting, via the camera, one or more persons within a predetermined distance from the vehicle and performing a predetermined activity, individually set tint levels on the photochromic windows based on the directed sun-glass mode.

2. The vehicle of claim 1, wherein the directed sun-glass mode is associated with a full tint level.

3. The vehicle of claim 1, wherein the angled sun-glass mode is associated with a tint level having a transparency greater than the directed sun-glass mode.

4. The vehicle of claim 3, wherein the shade sun-glass mode is associated with a tint level having a transparency greater than the angled sun-glass mode.

5. The vehicle of claim 1, wherein the processor is configured to:
   periodically capture second images of the area external to the vehicle; and
   update the sun profile based on the captured second images.

6. The vehicle of claim 1, wherein the sun profile includes at least one of a current position of the vehicle, a current orientation of the vehicle, a current position of the sun, and a predicted projection of the sun relative to the vehicle as a function of time.

7. The vehicle of claim 1, wherein the processor is configured to, responsive to detecting, via the camera, the one or more persons within the predetermined distance from the vehicle and performing the predetermined activity, set at least one of the photochromic windows to be fully tinted.

8. The vehicle of claim 1, wherein the processor is to:
   when the difference is greater than the threshold, determine whether a current projection of the sun overlaps with at least one photochromic window; and
   update the protection mode of the at least one photochromic window when the current projection of the sun overlaps with the at least one photochromic window.

9. A method to control tint levels of a vehicle, the method comprising:
   determining, with a processor, a sun profile based on images of an area external to the vehicle captured by a camera;
   determining a protection mode to reduce a current sun projection on an interior component of the vehicle based on the sun profile;
   determine, via sensors, a difference between an external ambient temperature and a cabin temperature;
   when the difference is greater than a threshold, setting, via photochromic controllers, tint levels on one or more photochromic windows of the vehicle based on the determined protection mode; and
   responsive to detecting, via the camera, one or more persons within a predetermined distance from the vehicle and performing a predetermined activity, setting at least one of the photochromic windows to be fully tinted.

10. The method of claim 9, wherein the protection mode is at least one of a directed sun-glass mode, an angled sun-glass mode, and a shade sun-glass mode.

11. The method of claim 10, wherein the directed sun-glass mode is associated with a full tint level.

12. The method of claim 10, wherein the angled sun-glass mode is associated with a tint level having a transparency greater than the directed sun-glass mode.

13. The method of claim 12, wherein the shade sun-glass mode is associated with a tint level having a transparency greater than the angled sun-glass mode.

14. The method of claim 10, further including, responsive to detecting, via the camera, the one or more persons within the predetermined distance from the vehicle and performing the predetermined activity, setting tint levels on the photochromic windows based on the directed sun-glass mode.

15. The method of claim 9, further including:
   periodically capturing second images of the area external to the vehicle; and
   updating the sun profile based on the captured second images.

16. The method of claim 9, wherein the sun profile includes at least one of a current position of the vehicle, a current orientation of the vehicle, a current position of the sun, and a predicted projection of the sun relative to the vehicle as a function of time.

17. The method of claim 9, further including:
when the difference is greater than the threshold, determining whether a current projection of the sun overlaps with at least one photochromic window; and
updating the protection mode of the at least one photochromic window when the current projection of the sun overlaps with the at least one photochromic window.

* * * * *